United States Patent
Doss et al.

(10) Patent No.: US 12,488,387 B2
(45) Date of Patent: *Dec. 2, 2025

(54) PROFILE BASED VIDEO CREATION

(71) Applicant: Wells Fargo Bank, N.A., San Francisco, CA (US)

(72) Inventors: Jaison Prabhu Doss, Nagercoil (IN); Naveen Hunsur Jayaramegowda, Mysuru (IN); Sadananda Kalappanahally Nagarajappa, Bangalore (IN); Venkata Reddy Yeruva, Bangalore (IN); Gowtham Reddyvari, Bangalore (IN); Ravi Chandra Singamsetty, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/742,802

(22) Filed: Jun. 13, 2024

(65) Prior Publication Data

US 2024/0331032 A1 Oct. 3, 2024

Related U.S. Application Data

(63) Continuation of application No. 18/451,650, filed on Aug. 17, 2023, now Pat. No. 12,039,595, which is a continuation of application No. 17/067,186, filed on Oct. 9, 2020, now Pat. No. 11,769,198.

(51) Int. Cl.
*G06Q 40/02* (2023.01)
*G06F 16/738* (2019.01)
*G06F 21/32* (2013.01)
*G06Q 40/12* (2023.01)

(52) U.S. Cl.
CPC .......... *G06Q 40/02* (2013.01); *G06F 16/739* (2019.01); *G06F 21/32* (2013.01); *G06Q 40/125* (2013.12)

(58) Field of Classification Search
None
See application file for complete search history.

(56) References Cited

U.S. PATENT DOCUMENTS

| | | | |
|---|---|---|---|
| 5,675,746 A * | 10/1997 | Marshall | G06T 15/00 705/35 |
| 7,050,997 B1 * | 5/2006 | Wood, Jr. | G06Q 40/06 705/36 R |
| 8,243,074 B1 * | 8/2012 | Kilat | G06Q 40/12 705/30 |
| 8,438,110 B2 | 5/2013 | Calman et al. | |
| 8,645,220 B2 | 2/2014 | Harper et al. | |

(Continued)

*Primary Examiner* — Divesh Patel
(74) *Attorney, Agent, or Firm* — Merchant & Gould P.C.

(57) ABSTRACT

An example system creates a video based on a user's financial profile for a specified time period and displays the video on a virtual reality device to help the user visualize the user's financial decisions resulting in the user's current financial status as well as visualize the user's predicted financial status in the future. The system analyzes the user's historical financial transactional data, profile information and relevant market and peer information to extract and predict one or more data points regarding the user's financial profile from the past, present and the future. The system generates a video about the user's financial profile by creating a storyline based on the one or more data points.

20 Claims, 6 Drawing Sheets

(56) References Cited

U.S. PATENT DOCUMENTS

| | | |
|---|---|---|
| 8,732,845 B1 | 5/2014 | Barker et al. |
| 9,378,664 B1 * | 6/2016 | Steckler ............ H04N 21/44008 |
| 9,633,476 B1 | 4/2017 | Laaser et al. |
| 10,114,451 B2 | 10/2018 | Martin |
| 10,504,185 B1 | 12/2019 | Buentello |
| 10,595,100 B2 | 3/2020 | Lee et al. |
| 2012/0242696 A1 * | 9/2012 | Martin ................. G06F 3/04815 |
| | | 345/633 |
| 2013/0021347 A1 | 1/2013 | Indelicato, III et al. |
| 2014/0164288 A1 * | 6/2014 | Present .................. G06Q 40/06 |
| | | 705/36 R |
| 2019/0051032 A1 * | 2/2019 | Chu ........................ G06T 13/40 |
| 2020/0228524 A1 | 7/2020 | Szafranski et al. |

* cited by examiner

PROFILE BASED VIDEO CREATION

BACKGROUND

Financial institutions, financial advisors and others commonly recommend that individuals engage in some form of financial planning. The financial planning can typically include aspects such as planning to purchase a home, planning for college for one's children and planning for retirement.

The development of a financial plan for an individual can include many factors, including the age of the individual, members and age of the individual's family, current employer and salary of family members, whether the individual owns or rents, and other factors. Changes to one or more of these factors can have an impact on the financial outcome for the individual.

SUMMARY

Embodiments of the disclosure are directed to a method implemented on an electronic computing device for creating a video based on a user's financial profile, the method comprising: receiving historical data; receiving user data; receiving external data; analyzing the received historical data and user data to extract a first plurality of data points; comparing the analyzed data with the external data to predict a second plurality of data points; generating a storyline based on the first plurality of data points and the second plurality of data points, wherein the storyline includes one or more entities, relationships between the entities and characters; determining one or more visual representations for representing each of the one or more entities, relationships and characters from the generated storyline; creating a plurality of video frames by feeding the generated storyline and determined visual representations into a plurality of template video frames; and sending the plurality of video frames to the user's virtual reality device.

In another aspect, an electronic computing device comprises: a processing unit; and system memory, the system memory including instruction which, when executed by the processing unit cause the electronic computing device to: receive historical data; receive user data; receive external data; analyze the received historical data and user data to extract a first plurality of data points; compare the analyzed data with the external data to predict a second plurality of data points; generate a storyline based on the first plurality of data points and the second plurality of data points, wherein the storyline includes one or more entities, relationships between the entities and characters; determine one or more visual representations for representing each of the one or more entities, relationships and characters from the generated storyline; create a plurality of video frames by feeding the generated storyline and determined visual representations into a plurality of template video frames; and send the plurality of video frames to the user's virtual reality device.

In yet another aspect, a virtual reality device to play a video based on a user's financial profile, the virtual reality device comprising: a processing unit; system memory; a headset; a camera oriented towards the user to capture biometric data associated with the user and gestures performed by the user; and a microphone to capture one or more voice commands from the user; wherein the system memory encodes instructions that when executed by the processing unit cause the virtual reality device to: capture biometric data associated with the user; send the captured biometric data to a financial institution electronic computing device to authenticate the user, upon authenticating the user, receive a request to select one or more visual representation for representing entities, relationships and characters associated with the user's financial profile; receive the user's selections for the one or more visual representations, wherein the selections can be made by the user using one or more gestures or voice commands; send the user's selections to the financial institution electronic computing device; receive a plurality of video frames associated with the user's financial profile; receive input from the user regarding one or more video frames of the plurality of video frames; send the user's input to the financial institution electronic computing device; receive a revised plurality of video frames, wherein the revised plurality of video frames incorporates the user's input; and play the revised plurality of video frames at a frame rate that is compatible with the virtual reality device.

The details of one or more techniques are set forth in the accompanying drawings and the description below. Other features, objects, and advantages of these techniques will be apparent from the description, drawings, and claims.

DETAILED DESCRIPTION

Figure 1:
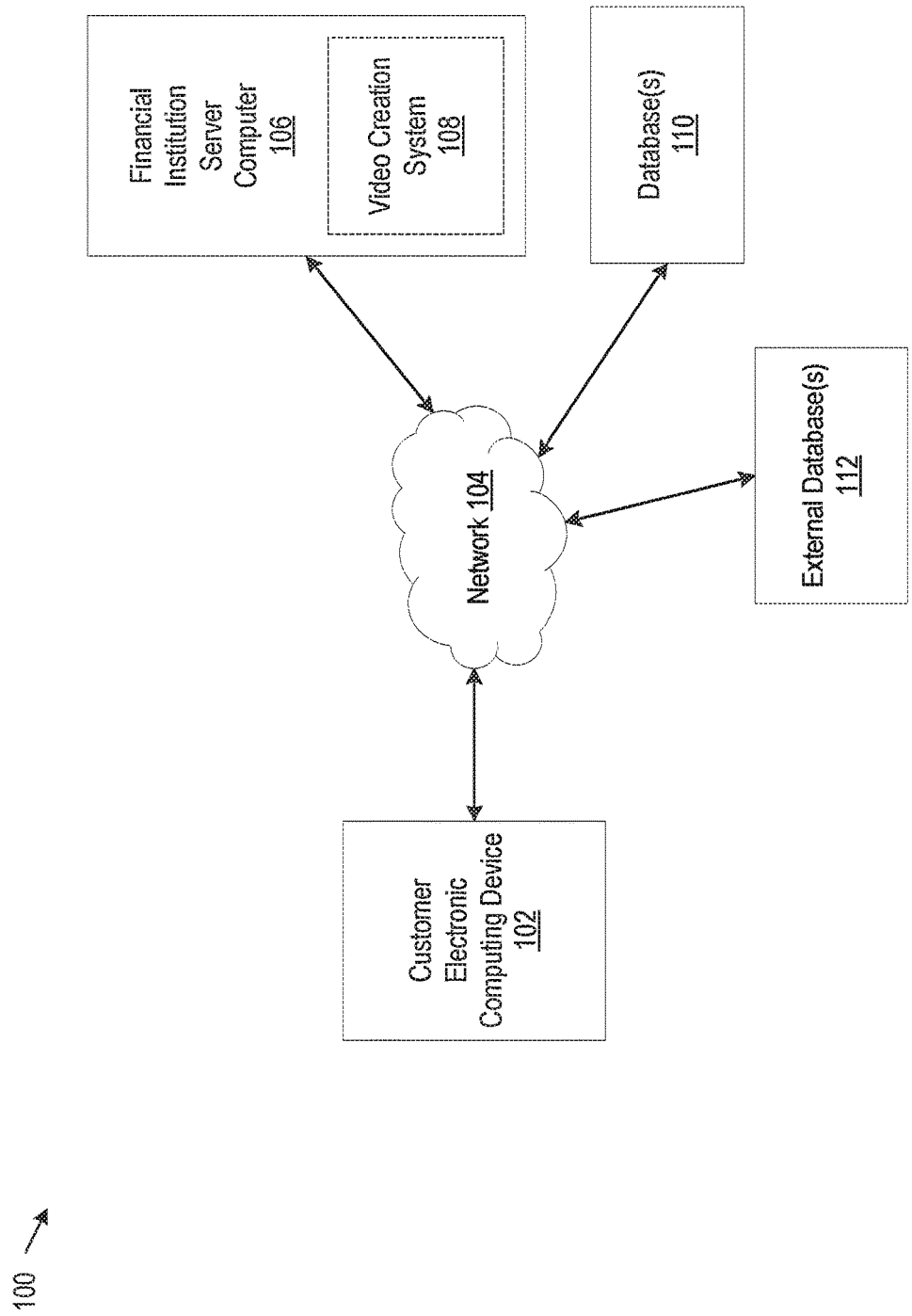
FIG. 1 shows an example system that supports the creation of a video based on a user's financial profile.

The present disclosure relates to creating videos based on financial profiles.

Financial institutions often have websites or mobile applications through which users of the financial institution can access their accounts and financial portfolio. In some instances, the financial institution website may include one or more tools that the users can use to manipulate or organize their financial portfolio information. For example, financial institutions may include a future financial return calculator on their website or mobile application that the user can use to calculate the future status of their financial portfolio. However, such future return calculators may deliver predictions and explanations in a format that is hard for the user to visualize or fully understand. Therefore, there is a need for a system and method that enables the user to visualize his/her financial status.

In a preferred embodiment, the disclosed system may be used by a financial institution to create videos of the financial profile of users of the financial institution who may want to visualize the events that led to their current financial status as well as predictions of their future financial status based on their current choices. A user of a financial institution includes any user having one or more financial accounts with the financial institution. Past events and financial transactions that have led to the user's current financial status, current financial choices of the user that may impact future financial status of the user and any external or personal events associated with the user that have an impact on the user's financial status is cumulatively referred to as the user's financial profile.

A financial institution may use the disclosed system to create a video, based on the user's financial profile, to help a user of the financial institution in visualizing their current and future financial status. The disclosed system may use a virtual (or augmented) reality device to display the created video in order for the user to fully visualize the story and events depicted in the video.

Virtual Reality (VR) is a computer-based multimedia environment where users are involved in a highly interactive three-dimensional world. Virtual reality enables users to visualize, manipulate and interact with a simulated environment instead of a physical environment. Augmented Reality (AR) is similar, in that it superimposed virtual reality aspects (e.g., images, icons, etc.) onto the users view of the real world. Although VR is described herein. AR is also applicable.

In an example, the proposed system may receive, as inputs, historical transactional data related to the user, a user's profile information and a time period selected by the user for which the user wishes to create the video. In some examples, the system may predict a plurality of data points based on an analysis of the received data and compare the analyzed data with a benchmark or peer information. In some examples, the system may generate a storyline based on the received data and the data from the comparative analysis. The system may then feed the storyline into predefined template that is used to create a plurality of VR compatible video frames. The system may then play the video at a suitable frame rate using a VR device.

The VR device may include a headset for the user to wear. The headset can include a wearable computer. The VR headset may include smart glasses, such as the Google Glass, or another smart glass that is similar to eyeglasses and can be worn by the user. In an example, the VR device may also include one or more cameras that may be oriented towards the user to capture biometric data associated with the user, as well gestures performed by the user. In another example, the VR device may include a microphone to capture one or more voice commands from the user. The wearable computer of the VR device may include voice recognition capabilities that can permit the user to direct the wearable computer via the voice commands. In yet another example, the VR device may include an optical display. The optical display may reflect projected images and may also permit the user to see through the display.

The example systems and methods result in an enhanced experience for the user. The VR device provides greater context for the user so that the user can appreciate and visualize how past, current, and/or future financial decisions impact the user's financial health. The financial institution thereby provides this enhanced experience to the user.

The disclosed system includes a practical application by reciting a particular apparatus, the VR device. The VR device is a concrete and specific electronic device that is configured for virtual reality by either or both of hardware and software. The VR device is further used to interact with the user's environment by capturing or receiving biometric data, voice commands and gestures and the VR device produces a useful result of displaying a three-dimensional video regarding the user's past, present and future financial profile, allowing the user to visualize his/her past, present and future financial status in a way that a video on a two-dimensional screen does not provide.

FIG. 1 illustrates an example system 100 that can support the creation of a video based on a user's financial profile. The system 100 includes a user electronic computing device 102, a network 104, a financial institution server computer 106 and a database 110. The financial institution server computer 106 includes a video creation module 108. More, fewer or different modules can be used.

In some examples user electronic computing device 102 is an electronic computing device of the user. In some examples, the electronic computing device can be a virtual reality device. In other examples, the electronic computing device can be a desktop computer, a laptop computer, a mobile electronic computing device such as a smartphone or a tablet computer. The electronic computing device permits the user to access the financial institution server computer 106 over network 104.

In a preferred embodiment, the user electronic computing device 102 is a VR device 102 that can include a head mountable display unit having a compatible visual interface. Example VR devices available in the market include Oculus, Samsung Odyssey, etc. In some examples, the financial institution can provide one or more VR devices 102 to one or more users registered to perform all the banking activities via the VR device 102 without visiting the bank physically. In other examples, the user electronic computing device 102 is a smartphone, tablet, desktop, or other computing device with a display that is configured to show VR. Other configurations are possible.

In some examples, the VR device 102 can authenticate the user by performing an iris scan of the user. Other methods of authenticating the user are also possible. Once authenticated, the user can instruct the video creation module 108 to create a video of the user's financial profile for a specific time period.

Although a single user electronic computing device 102 is shown, the system 100 allows hundreds, thousands, or more computing devices to connect to the financial institution server computer 106.

In some examples, the network 104 is a computer network, such as the Internet. The user on user electronic computing device 102 can access financial institution server computer 106 via network 104.

In some examples, the financial institution server computer 106 is a server computer of a financial institution, such as a bank. Although a single server is shown, in reality the financial institution server computer 106 can be implemented with multiple computing devices, such as a server farm or through cloud computing. Many other configurations are possible.

The user can have one or more financial accounts at the financial institution. In addition, the financial institution server computer 106 can have access to a personal profile for the user and can have access to a history of financial transactions made by the user at the financial institution. In some implementations, the financial institution server computer 106 can comprise a plurality of server computers.

In one example, the video creation module 108 can create a video that depicts the financial life story for a user. As discussed in more detail later herein, the video creation module 108 can use the user's transactional information and the user's profile information to generate a plurality of video frames that depict the financial profile of the user. Further, the video creation module 108 uses predictive analysis using artificial intelligence (AI) techniques to generate a plurality of video frames showing the future financial status of the user. The video creation module 108 can also implement an interactive aspect of the video in which the user can add and remove events and move events on storyline in which the outcomes of these action can be identified and incorporated into the video. The video creation module 108 can also implement other aspects of the user's financial storyline, as discussed later herein.

The example database 110 is an electronic database that can store financial records for the individual and for family members of the individuals. The database 110 may be maintained by the financial institution itself or one or more external enterprises for the financial institution. The database 110 can be accessed by financial institution server computer 106 to retrieve relevant data associated with the creation of the video based on the user's financial profile.

In some examples, database 110 may include historical data, user data and multimedia data among other data. The historical, user and multimedia data may be organized in one database or distributed among a plurality of databases that may be maintained by the financial institution itself or another entity.

The historical data can include historical financial transaction data related to the user, such as user's historical deposit and withdrawal information and user's spending history among other historical data. An example of a user's historical data includes data showing that that user usually goes to the market on Sundays and spends around $200.

The user data includes user profile information including demographic, biometric, biological and lifestyle information associated with the user. An example of a user data includes data such as the user's race, ethnicity, age, gender, marital status, whether the user has children, employment status, salary, monthly memberships that the user pays for, etc.

The multimedia data includes data related to representations of different entities, objects, characters, relationships, etc. During the creation of the video, the video creation module 108 uses one or more visual representations of entities and characters to illustrate the entities and people associated with the user's financial profile.

Entities are businesses, organizations, institutions, etc. that the user has interacted with in the past or will interact with in the future in a financial capacity. In other words, entities are third-parties that the user has had or will have a financial transaction with. For example, if the user has student loans, the loan provider is represented as an entity.

Characters are persons or even pets associated with user that impacts the user's financial status in some manner. For example, if the user is married or has kids or a dog, the spouse, the children or the pet may be represented in the video as characters.

In some examples, the entities, and characters may be represented as animated objects, cartoons, simple human figures, etc. Other ways of representing entities and characters that impact the user's financial status are also possible.

In some examples, the system 100 also includes one or more external databases 112, wherein the external database may be associated with one or more external entities, entities that may not directly be controlled be the financial institution. The one or more external databases 112 may include data that helps with the creation of a plurality of data points related to the prediction of the user's financial status in the future. For example, the external information may include, but are not limited to market information, peer information, benchmark information, average income of people of specific age group, standard savings procedure for employed people etc. Examples of how the data from the external databases 112 is used by the video creation module 108 is described in further detail in relation to the data extraction sub-module 204 and data processing sub-module 206 from FIG. 2.

Figure 2:
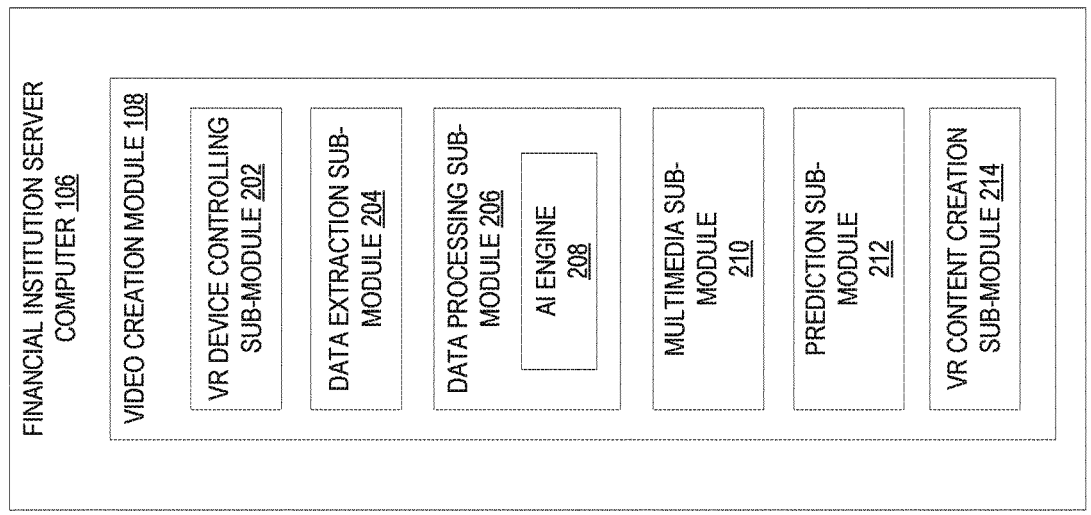
FIG. 2 illustrates an example configuration of a financial institution server computer of the system of FIG. 1.

FIG. 2 illustrates an example configuration of the financial institution server computer 106 including an example implementation of the video creation module 108. As detailed in relation to FIG. 1, the financial institution server computer 106 includes the video creation module 108, which, in turn, may be implemented using one or more sub-modules.

In some examples, the disclosed video creation module 108 may create a video in 3D visualization format about the user's financial profile for display in the user's VR device 102. The head mounted display of the VR device 102 enables the user to feel that an illusory environment surrounds the user and the user is physically and mentally present inside the environment i.e. an immersive experience. For example, when the user turns head, the virtual world also turns with the user so that the feel of illusion is never lost. Thus, the user can visualize the created video in a 3D format using the VR device 102. The user can further visualize the anticipated future financial status by providing the desired input to the video creation module via the VR device 102, wherein the video creation module creates a video based on the user input and predictive analysis of external information.

In some examples, the video creation module 108 comprises a VR device controlling sub-module 202, a data extraction sub-module 204, a data processing sub-module 206 coupled with an AI engine 208, a multimedia sub-module 210, a prediction sub-module 212 and a VR content creation sub-module 214.

In some examples, the VR device controlling sub-module 202 can control each communication received from or transmitted to the VR device 102 of the user by creating suitable request-response protocol. The VR device controlling sub-module 202 can automatically authenticate the user wearing the registered VR device 102 by detecting and validating biometric information such as the iris of the user. The VR device controlling sub-module 202 can further receive gestures or voice commands from the user of the VR device 102, wherein the gesture or voice command relates to the visual context being displayed in the respective VR devices 102 in response to the gesture or voice command.

In some example, the data extraction sub-module 204 can extract information related to the user's historical transactions and profile from historical data and user data of the database 110 respectively for enabling the data processing sub-module 206 to create a plurality of data points. Upon creation of plurality of data points, the data extraction sub-module 204 may further retrieve external information associated with data points related to the user from the one or more external databases 112.

In some examples, the data processing sub-module 206 includes an AI engine 208. The data processing sub-module 206 may receive the extracted data of the user from data extraction sub-module 204 and analyzes, using the AI engine 208, the extracted information to create a plurality of data points. The plurality of data points may include, but is not limited to: average income growth, over the time changes in category of expenses, unusual spike in expense pattern etc.

The data processing sub-module 206 may retrieve the transactional information of the user for the time period specified by the user and categorize the transactions. For example, the data can be categorized based on the incurred expenses in plurality of merchandises. As an example, the data processing sub-module 206 categorizes the transactional information into expenses in different categories such as food, house rent, health treatment, investment, health insurance, education, travel, entertainment, shopping etc. Other ways of categorizing the data is also possible.

In one example, the data processing sub-module 206 can further assign a predefined weightage score to each category of transactions so that the analysis can be performed based on the overall weightage score of the categorization. As an example, health insurance category can have more weightage score than travel category so that health insurance analysis is performed prior to the travel category.

The data processing sub-module 206, using the AI engine 208, may further analyze the user profile information to determine the user's potential to overcome the adverse situation in case of an unexpected financial contingency. The AI engine 208 may also enable the data processing sub-module 206 to generate plurality of facts based upon the data points and the received external information, wherein the plurality of facts includes, but are not limited to, conclusions on unnecessary expenses in one or more categories, good/bad investments etc.

Based on the analyses, the AI engine 208 generates a storyline of the user's financial history for the specified time period based on the plurality of datapoints and the generated facts related to the data points.

In some examples, the multimedia sub-module 210 can provide the user with a plurality of entities and probable relationship between the plurality of entities based on the analysis of the storyline from the data processing sub-module 206. In one example, the user selects one or more entities and one or more relationships between the entities in the respective VR device 102. The multimedia sub-module 210 can further enable the user to select one or more characters for representing the selected entities, wherein one or more characters includes animated figures, cartoons, simple human figures etc.

In some other examples, the multimedia sub-module 210 can also dynamically modify the chosen character of the respective entity based upon the storyline and related data points. For example, the default character in the generated video may include a person with a standard physique. However, if the historical data related to the user shows that the user is a regular visitor of a fast-food center, the multimedia sub-module 210 may dynamically alter the default character as an overweight, unhealthy figure in the successive frames of the video.

Further, the multimedia sub-module 210 may determine a suitable template for the storyline and develop a plurality of video frames based on the storyline, user selected entities, relationships, characters, and plurality of facts. The multimedia sub-module 210 can push the relevant facts into the respective video frames of the storyline so that the user can visualize different aspects of the financial profile in the form of a video. The multimedia sub-module 210 can further provide the user with video frames with placeholder entities, relationship and characters until input from the user is received. In some examples, the user may provide feedback regarding the characters, entities and relationships via the VR device 102. Other ways of providing feedback is also possible.

In some examples, the prediction sub-module 212 may determine one or more facts based on the predictive analysis of the user's historical transaction, user's profile, and related external information. For example, historical data associated with the user may show that the user usually goes to the market on Sundays and spends around $200. The prediction sub-module 212 may determine that the user would have saved around $1000 in a year if the user went to the market on Wednesdays rather than on Sundays because the discount percentage is higher on Wednesdays than on Sundays.

In other examples, the prediction sub-module 212 may also identify the inappropriate investments of the past and provide recommendations about such future investment for the user so that the user may adopt any such recommendation and increase his/her savings. The prediction sub-module 212 further determines the user future financial status based on user input, historical transactions, user's financial portfolio from the financial institution databases 110 and external information from the one or more external databases 112. The external information may include but not limited to current inflation rate, market situation, current average rate of return, statistical analysis of future market etc. The prediction sub-module 212 can further suggest the plurality of investment plans to the user to provide the user better return in the future.

In one example, a user may desire to check the future financial status if he/she invests $10,000 in a savings plan today. The prediction sub-module 212 may determine the standard rate of return of the investment based on the current market scenario, anticipated inflation, statistical analysis of future market etc. and display one or more suitable investment products as retrieved from the financial institution database 110 regarding which products can provide better returns in the future.

In some examples, the VR content creation sub-module 214 may design the desired virtual environment, which contains with plurality of video frames as designed by the multimedia sub-module 210. The VR content creation sub-module 214 receives the user provided input associated with the respective placeholder entities, relationships and characters. The VR content creation sub-module 22 then supplies the inputs to the data processing sub-module 206 to process the inputs. The VR content creation sub-module 214 further receives the plurality of video frames designed based upon the updated storylines and designs the virtual environment for the user's future financial status accordingly.

Figure 3:
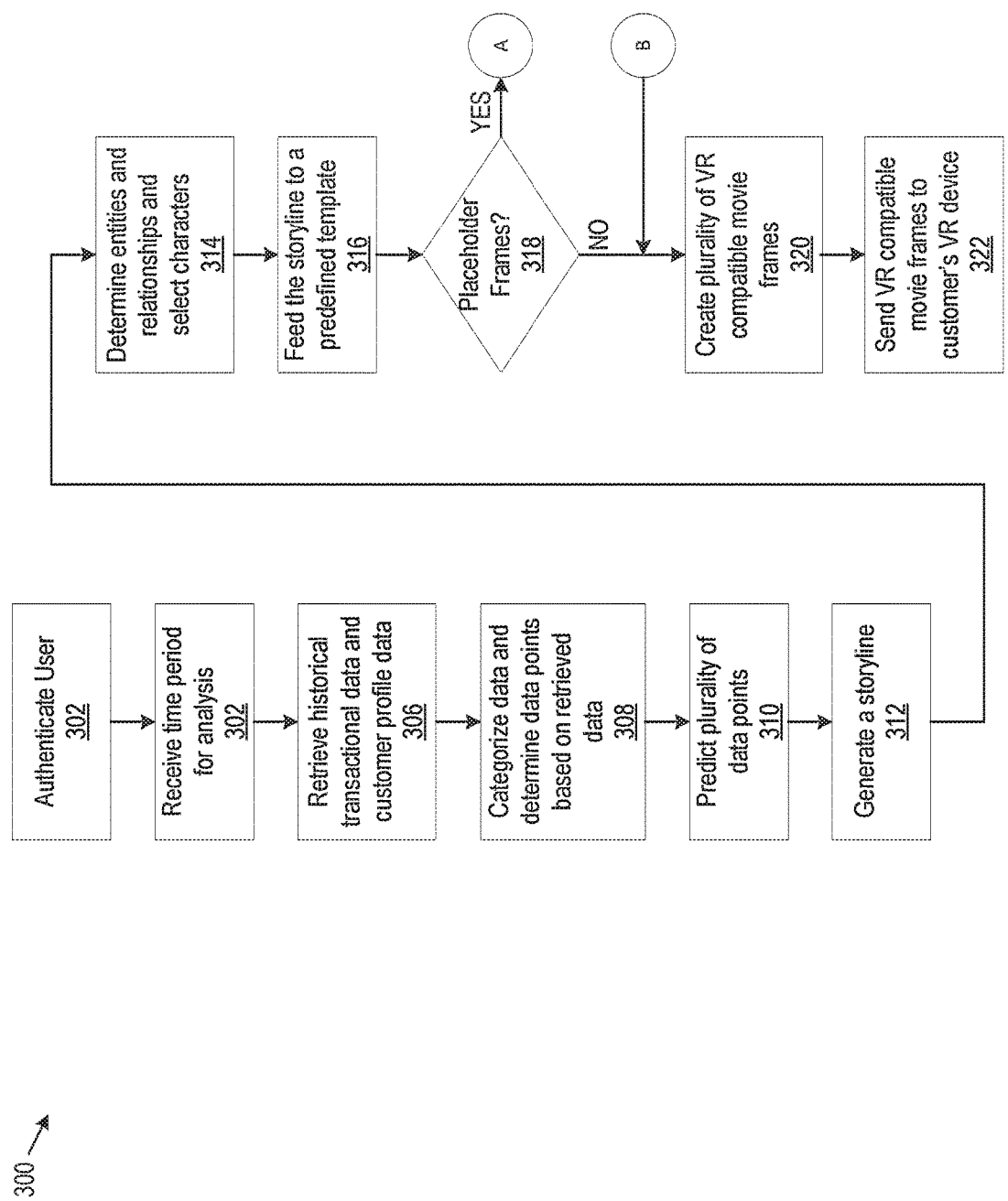
FIG. 3 shows an example method for creating a video based on the user's financial profile.

FIG. 3 shows a flowchart of an example method 300 for creating a video based on the user's financial profile. The method 300 can be implemented on a server computer of a financial institution, for example on financial institution server computer 106. The video can be rendered on an electronic computing device of a user of the financial institution, for example on user electronic computing device 102.

At operation 302, the financial institution server computer 106, receives authentication credentials from the user electronic computing device 102. In a preferred embodiment, the VR device controlling sub-module 202 of the video creation module 108 receives authentication credentials from the VR device 102. The financial institution server computer 106 can use user data from database 110 to authenticate the user and communicate the same to the VR device 102 through the VR device controlling sub-module 202.

At operation 304, the user electronic computing device 102 sends and the financial institution server computer 106 receives a time period for which the video creation module 108 is to create a video associated with the user's financial profile. In some examples, the user selects a time period using the user electronic computing device 102 for which the user is interested in viewing a video regarding his/her financial profile. In an example, the user can request for a financial analysis of the user's portfolio for a specified period such as the last 5 years, by using voice command or physical gesture in the VR device 102.

At operation 306, the financial institution server computer 106, using the data extraction sub-module 204 of the video creation module 108, retrieves data regarding the financial, biographical, demographical, lifestyle aspects of the user from one or more databases 110. Upon retrieving the data, the data extraction sub-module 204 extracts a plurality of data points regarding the user. For example, the financial institution server computer 106 receives historical data including transactional information associated with the user's finances from the database 110.

Further, the financial institution server computer 106 also receives user data including biographical, demographical, and lifestyle data associated with the user's profile from the database 110. In addition to the historical data and user data, the financial server computer 106 also receives data external information, including, but not limited to, market information, peer information, benchmark information, average income of people of specific age group, standard savings procedure for employed people, etc. In an example, if the user requested for a financial analysis video for the last 5 years, the video creation module 108 retrieves user's transactional information for last 5 years and user's profile from the database 110 and external information from the one or more external databases 112.

At operation 308, the financial institution server computer 106, using the AI engine 208 and the data processing sub-module 206 of the video creation module 108, analyzes the extracted data by categorizing the transactional data for the time period specified by the user in operation 304 into a plurality of categories. For example, the categories may be based on incurred expenses and can include categories such as food, house rent, health treatment, investment, health insurance, education, travel, entertainment, shopping, etc. Other ways of categorizing the extracted data for analysis is also possible.

In addition to categorizing the user's transactional data, the data processing sub-module 206 can also determine plurality of data points based on dependent information and lifestyle information of the user based on the user's transaction information or historical data and the user's profile information or user data.

In an example, the video creation module 108 determines the dependent information based on the transaction of medical bill, education payment, shopping from kids shop etc. The video creation module 108 determines the lifestyle information based on the analysis of frequency of visiting restaurants, foreign travel, purchase of expensive gadgets etc. The video creation module 108 further determines the daily physical activity of the user vis the user's personal devices such as Smart Band, Fit Bit etc. Based on the above, the video creation module 108 creates plurality of datapoints from the comparative analysis of transactional information, user profile and the externally available information related to the data points.

At operation 310, the financial institution server computer 106, using the prediction sub-module 212 of the video creation module 108, predicts a plurality of data points based upon an analysis of the categorized information, dependent information from operation 308 and compares the analyzed data points with benchmark of peer information retrieved from external databases. An example of the predicted information from the prediction sub-module 212 can be that the user could have saved $2000 on medical expenses if the user exercised for 2 hours every day.

At operation 312, the financial institution server computer 106, using the AI engine 208, the data processing sub-module 206 of the video creation module 108, generates a storyline of the user's financial history for the specified time period based on the plurality of datapoints and the generated facts related to the datapoints from operations 308, 310. In some examples, the video creation module 108 may permit the user to manually alter the storylines through selections made through the VR device 102. In some examples, the generated storyline may be structured as a timeline of events that have happened in the user's life that have impacted the user's financial profile. Other ways of structuring the storyline are also possible.

At operation 314, the financial institution server computer 106, using the multimedia sub-module 210 of the video creation module 108, determines one or more entities, the relationships between the one or more entities and selects one or more characters for representing the characters associated with the generated storyline in the final video regarding the user's financial profile. In a preferred embodiment, the multimedia sub-module 210 enables the VR device controlling sub-module 202 to receive the user's selections regarding entities, relationships, and characters to represent the selected entities and relationships from the VR device 102.

At operation 316, the financial institution server computer 106, using the multimedia sub-module 210, feeds the generated storyline and the selection of characters, entities and relationships to a predefined video template. A video template includes one or more video frames that may depict one or more commonly occurring financial events or transactions. Video templates may be stored in database 110 or in another database. For example, a commonly used template may include one or more video frames depicting a user purchasing a house. In some examples, template video frames may include video frames showing common events such as a user getting married, having children, going to college, getting a job, retiring, etc. Other types of events, character backgrounds, and storylines may be used as the basis for template video frames. The financial institution server computer 106 may use the template video frames to customize it by altering the characters and the entity (the home) as it relates to the user.

In some examples, the multimedia sub-module 210 of the video creation module 108 determines a suitable template for the generated storyline and can develop a plurality of video frames based on the storyline, selected entities, relationships and characters and data points. The multimedia sub-module 210 can dynamically push the relevant facts into the respective video frames of the storyline so that the user can receive different aspects of the financial profile.

At operation 318, the financial institution server computer 106, determines whether the multimedia sub-module 210 needs to generate one or more placeholder frames that require further input from the user to be complete the video. In some examples, placeholder frames may include one or more video frames that are blank or include some default characters or entities but do not include details customized to the user's financial profile. For example, users may request to view a video over a time period including the user's past as well as the future. In some examples, the disclosed system may not have all information to create the video frames pertaining to the user's future financial profile. So, the disclosed system may create the video based on the user's past and present financial profile but may include placeholder video frames that may be blank or include default characters, entities and storylines. The created video with the placeholder video frames may be updated at a later time by the disclosed system based on additional input from the user. In other examples, the disclosed system may not need to create placeholder video frames if the disclosed system has all information required to predict the user's future financial status.

Typically, a placeholder frame is needed when the time period for financial analysis of the user extends to the future and one or more facts impacting the future financial status of the user is unknown and requires further input from the user. In such a case, additional operations are required to complete the video frames and is described in greater detail in relation to FIG. 4. Otherwise, the financial institution server computer 106 moves on to operation 320.

At operation 320, the financial institution server computer 106, using the VR content creation sub-module 214, creates a plurality of VR device compatible video frames as designed by the multimedia sub-module 210.

At operation 322, the financial institution server computer 106, using the VR device controlling sub-module 202 sends the VR device compatible video frames created by the VR content creation sub-module 214 to the VR device 102 where the user can play the VR device compatible video frames at an appropriate frame rate using the VR device 102, which forms the video based on the user's financial profile.

Figure 4:
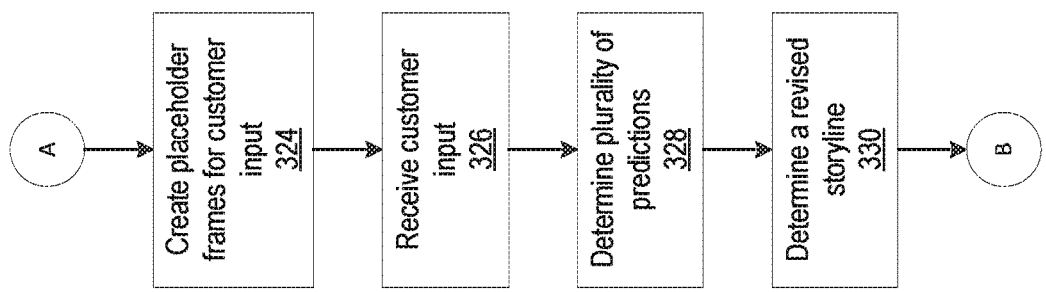
FIG. 4 shows additional operations of the example method for creating a video of FIG. 3.

FIG. 4 shows a flowchart of additional operations for example method 300 for creating a video based on the user's financial profile.

At operation 318 of FIG. 3, if the financial institution server computer 106 determines that the multimedia sub-module 210 requires further input from the user in order to generate video frames depicting the future financial status of the user, the financial institution server 106 executes operation 324 to 330 from FIG. 4 before returning to operation 320 from FIG. 3.

At operation 324, the financial institution server computer 106, using the multimedia sub-module 210 creates one or more placeholder video frames based on the user's desire to analyze future financial goals. Typically, a placeholder frame is needed when the time period for financial analysis of the user extends to the future and one or more facts impacting the future financial status of the user is unknown and requires further input from the user. Other reasons for creating a placeholder frame is also possible.

In an example, a placeholder frame may be created when the video creation module 108 requires additional information about the user's future investment strategies. For example, the user, using the VR device 102, may provide one or more inputs regarding future investments, such as desired lump sum investment in a product, desired customization in the current portfolio, etc.

At operation 326, the financial institution server computer 106, using the multimedia sub-module 210, enables the VR device controlling sub-module 202 to receive the input(s) from the user associated with the placeholder frames in operation 324.

At operation 328, the financial institution server computer 106, using the AI engine 208 and the multimedia sub-module 210, determines a plurality of predictions based on the user inputs from operation 326 regarding the user's future financial status. In an example, the multimedia sub-module 202 of the video creation module 108 further determines the predicted information based on the already extracted historical transactional information and the user input already incorporated into the placeholder.

At operation 330, the financial institution server computer, using the multimedia sub-module 210, generates one or more revised storylines based on the predictions from operation 328. Based on the revised storylines, the multimedia sub-module 210 further determines if one or more of the video frames need to be revised or regenerate to accommodate the revised storylines.

At the conclusion of operation 330, the financial institution server computer executes operations 320 and 322 as described in relation to FIG. 3.

Figure 5:
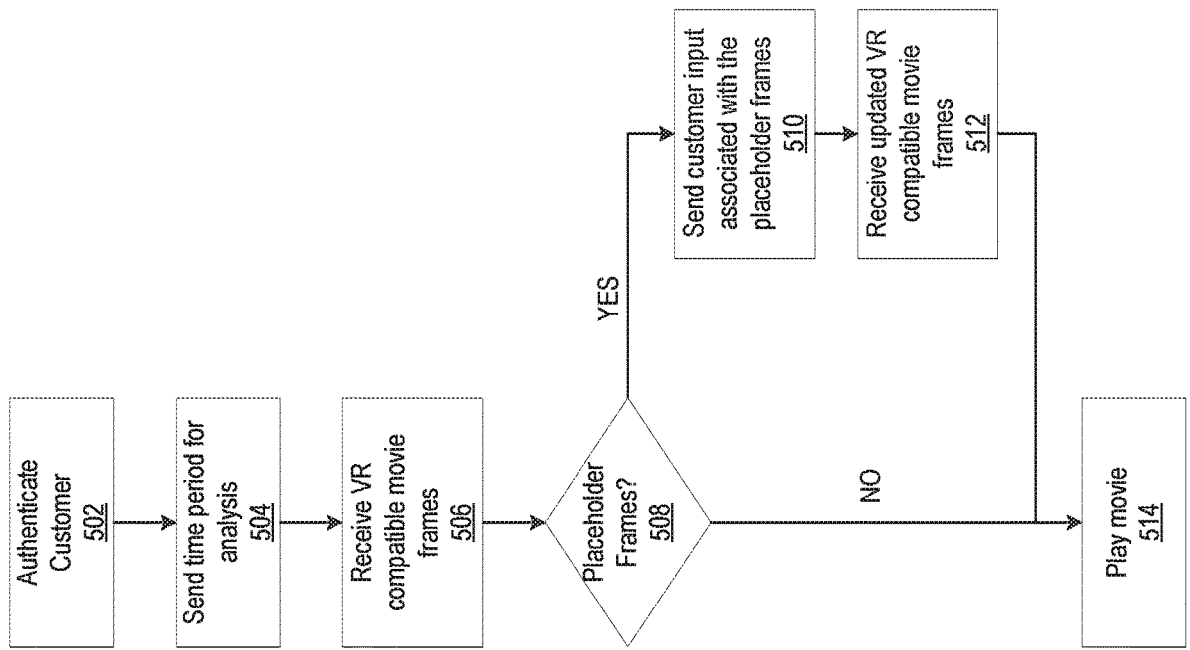
FIG. 5 shows another example method for creating a video based on the user's financial profile.

FIG. 5 shows a flowchart of yet another example method 400 for creating a video based on the user's financial profile. The method 400 can be implemented on a user electronic computing device 102 such as the VR device 102.

At operation 402, the AR device 102 authenticates the user. In some examples, the user may wear the headset associated with the VR device 102 and the VR device 102 scans the iris of the user as part of the authentication process to authenticate the user. The scanned biometric data is then sent to the VR device controlling sub-module 202 of the video creation module 108 implemented on the financial institution server computer 106, where the VR device controlling sub-module 202 can authenticate the user by retrieving the user data from database 110, which may include the user's biometric data, and validating the received biometric data. Upon positive authentication by the VR device controlling sub-module 202, the VR device 102 may receive a message saying the same. Other ways of authenticating the user (e.g., password, pin, etc.) are also possible.

At operation 404, the VR device 102 sends the time period over which the video analyzing the user's financial profile is to be created to the financial institution server computer 106. In some examples, the VR device 102 presents the user with an option to select the time period over which to create the video regarding the user's financial profile. The user may the use gestures or voice commands to select the time period. Other ways of selecting the time period are also possible.

At operation 406, the VR device 102 receives the VR compatible video frames from the financial institution server computer 106. However, the video frames may include one or more placeholder frames that require further input from the user in order to provide a more complete analysis of the user's future financial status.

At operation 408, the VR device 102 determines whether there are one or more placeholder frames within VR compatible video frames received from the financial institution server computer 106 in operation 406. If it is determined that there are one or more placeholder frames, the VR device 102 executes operation 410, otherwise, the VR device 102 executes operation 414.

At operation 410, the VR device 102 sends the user's inputs associated with the placeholder frame. In some examples, the VR device 102 displays the placeholder frames, requesting the user to provide one or more inputs. The user may then provide input regrading one or more aspects of the one or more placeholder frames using the gestures or voice commands with the VR device 102. Other methods of providing inputs regarding the placeholder frames is also possible.

At operation 412, the VR device 102 receives updated and revised VR compatible video frames with the placeholder frames replaced with completed video frames.

At operation 414, the VR device 102 plays the VR compatible video frames at an appropriate frame rate using the VR device 102, which forms the video based on the user's financial profile.

Figure 6:
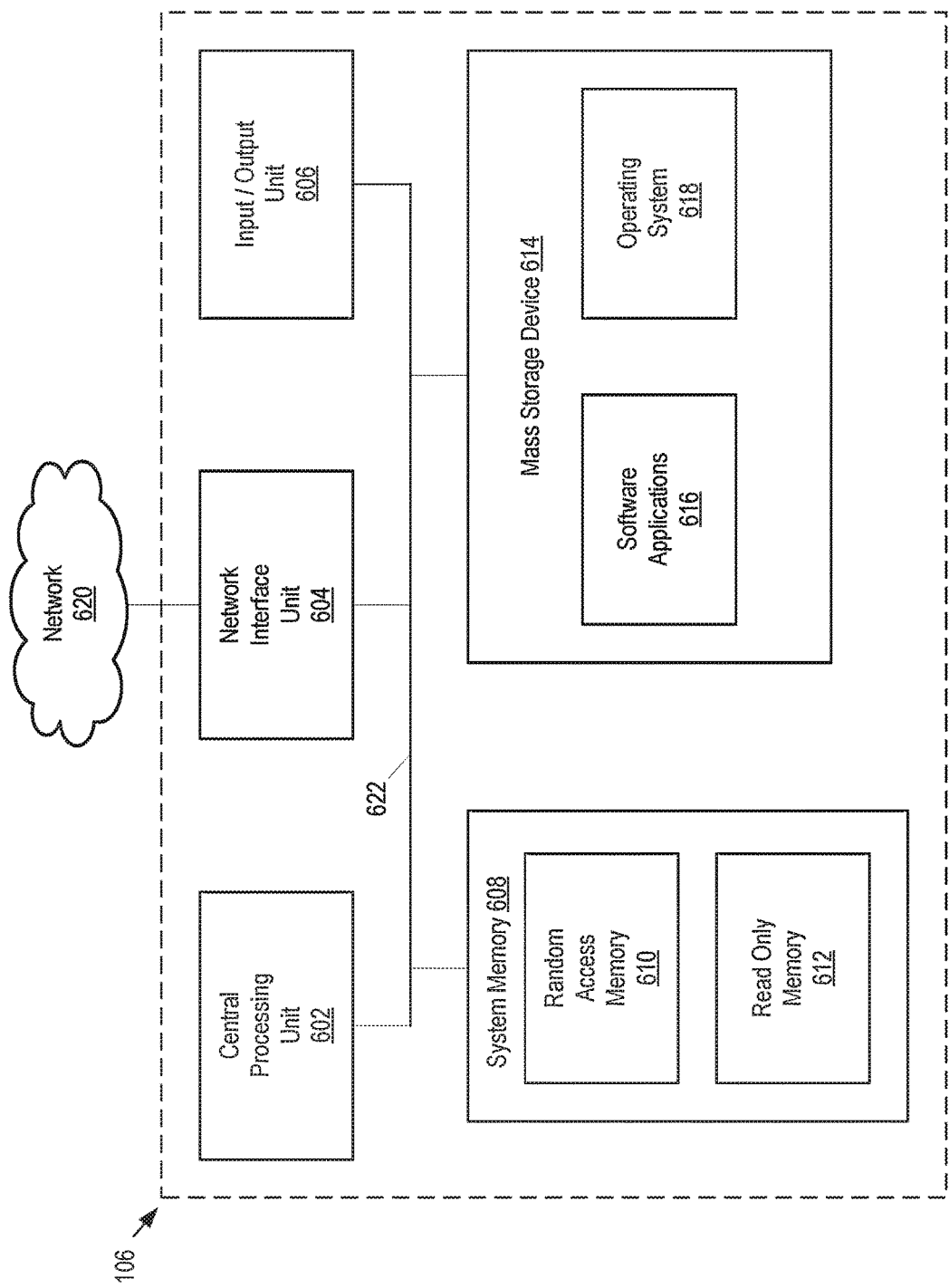
FIG. 6 shows example physical components of the electronic computing devices of FIG. 1.

As illustrated in the example of FIG. 6, financial institution server computer 106 includes at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system that contains the basic routines that help to transfer information between elements within the financial institution server computer 106, such as during startup, is stored in the ROM 512. The financial institution server computer 106 further includes a mass storage device 514. The mass storage device 514 is able to store software instructions and data. Some or all of the components of the financial institution server computer 106 can also be included in user electronic computing device 102.

The mass storage device 514 is connected to the CPU 502 through a mass storage controller (not shown) connected to the system bus 522. The mass storage device 514 and its associated computer-readable data storage media provide non-volatile, non-transitory storage for the financial institution server computer 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central processing unit can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the financial institution server computer 106.

According to various embodiments of the invention, the financial institution server computer 106 may operate in a networked environment using logical connections to remote network devices through the network 520, such as a wireless network, the Internet, or another type of network. The financial institution server computer 106 may connect to the network 820 through a network interface unit 504 connected to the system bus 522. It should be appreciated that the network interface unit 504 may also be utilized to connect to other types of networks and remote computing systems. The financial institution server computer 106 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the financial institution server computer 106 can store software instructions and data. The software instructions include an operating system 518 suitable for controlling the operation of the financial institution server computer 106. The mass storage device 514 and/or the RAM 510 also store software instructions, that when executed by the CPU 502, cause the financial institution server computer 106 to provide the functionality of the financial institution server computer 106 discussed in this document. For example, the mass storage device 514 and/or the RAM 510 can store software instructions that, when executed by the CPU 502, cause the financial institution server computer 106 to display received data on the display screen of the financial institution server computer 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a virtual reality device, the method comprising:
    sending, to an electronic computing device, a request to create a video of a financial profile of a user;
    receiving, from the electronic computing device, the video of the financial profile of the user, the video including a storyline created by the electronic computing device based on a prediction of a financial status of the user, wherein the video includes one or more placeholder video frames corresponding to gaps in the prediction;
    displaying the one or more placeholder video frames on the virtual reality device;
    receiving an input from the user regarding the one or more placeholder video frames;
    sending the input to the electronic computing device;
    receiving, from the electronic computing device, a revised video with an updated storyline with the one or more placeholder video frames replaced with completed video frames, the updated storyline being generated by the electronic computing device using an updated prediction based on the input from the user; and
    playing the revised video on the virtual reality device.

2. The method of claim 1, wherein the video of the financial profile of the user is created based on the financial profile of the user over a time period.

3. The method of claim 2, further comprising:
    presenting on the virtual reality device an option to select the time period over which to create the video regarding the financial profile of the user;
    receiving a selection of the time period from the user on the virtual reality device; and
    sending, to the electronic computing device, the time period over which the video of the financial profile of the user is to be created.

4. The method of claim 1, further comprising:
    authenticating the user using the virtual reality device.

5. The method of claim 4, wherein the authenticating is performed by the virtual reality device by validating a biometric parameter of the user.

6. The method of claim 1, wherein the prediction of the financial status of the user is based on an analysis of historical financial data and personal data of the user.

7. The method of claim 6, wherein the personal data includes demographical, biometric, biological and lifestyle information.

8. The method of claim 7, wherein the video of the financial profile of the user includes a visual representation of the user and wherein the visual representation of the user is dynamically altered based on the storyline and the updated storyline.

9. The method of claim 6, wherein the video of the financial profile of the user comprises visual representations of one or more entities and one or more characters.

10. The method of claim 9, wherein the one or more entities are organizations that the user has had financial interactions with in the past and are identified by analyzing historical financial data associated with the user.

11. A virtual reality device comprising:
a processing unit; and
system memory, the system memory including instruction which, when executed by the processing unit cause the virtual reality device to:
send, to an electronic computing device, a request to create a video of a financial profile of a user;
receive, from the electronic computing device, the video of the financial profile of the user, the video including a storyline created by the electronic computing device based on a prediction of a financial status of the user, wherein the video includes one or more placeholder video frames corresponding to gaps in the prediction;
display the one or more placeholder video frames on the virtual reality device;
receive input from the user regarding the one or more placeholder video frames;
send the input to the electronic computing device;
receive, from the electronic computing device, a revised video with an updated storyline with the one or more placeholder video frames replaced with completed video frames, the updated storyline being generated by the electronic computing device using an updated prediction based on the input from the user; and
play the revised video on the virtual reality device.

12. The virtual reality device of claim 11, wherein the video of the financial profile of the user is created based on the financial profile of the user over a time period.

13. The virtual reality device of claim 12, wherein the instructions, when executed by the processing unit, further causes the virtual reality device to:
present an option to select the time period over which to create the video regarding the financial profile of the user;
receive a selection of the time period from the user on the virtual reality device; and
send, to the electronic computing device, the time period over which the video of the financial profile of the user is to be created.

14. The virtual reality device of claim 11, wherein the instructions, when executed by the processing unit, further causes the virtual reality device to:
authenticate the user using the virtual reality device.

15. The virtual reality device of claim 14, wherein authenticating the user includes validating a biometric parameter of the user at the virtual reality device.

16. The virtual reality device of claim 11, wherein the prediction of the financial status of the user is based on an analysis of historical financial data and personal data of the user.

17. The virtual reality device of claim 16, wherein the personal data includes demographical, biometric, biological and lifestyle information.

18. The virtual reality device of claim 17, wherein the video of the financial profile of the user includes a visual representation of the user and wherein the visual representation of the user is dynamically altered based on the storyline and the updated storyline.

19. The virtual reality device of claim 16, wherein the video of the financial profile of the user comprises visual representations of one or more entities and one or more characters.

20. The virtual reality device of claim 19, wherein the one or more entities are organizations that the user has had financial interactions with in the past and are identified by analyzing historical financial data associated with the user.

* * * * *

UNITED STATES PATENT AND TRADEMARK OFFICE
CERTIFICATE OF CORRECTION

| | | |
|---|---|---|
| PATENT NO. | : 12,488,387 B2 | Page 1 of 1 |
| APPLICATION NO. | : 18/742802 | |
| DATED | : December 2, 2025 | |
| INVENTOR(S) | : Jaison Prabhu Doss et al. | |

It is certified that error appears in the above-identified patent and that said Letters Patent is hereby corrected as shown below:

In the Claims

Column 15, Line 7, Claim 11: delete "instruction" and insert --instructions--

Signed and Sealed this
Tenth Day of February, 2026

John A. Squires
*Director of the United States Patent and Trademark Office*